US008722271B2

(12) United States Patent
Artibise et al.

(10) Patent No.: US 8,722,271 B2
(45) Date of Patent: May 13, 2014

(54) FLOW FIELD PLATE WITH RELIEF DUCTS FOR FUEL CELL STACK

(75) Inventors: Robert Artibise, Vancouver (CA); Albert Chiu, Richmond (CA)

(73) Assignees: Daimler AG, Stuttgart (DE); Ford Motor Company, Dearborn, MI (US)

( * ) Notice: Subject to any disclaimer, the term of this patent is extended or adjusted under 35 U.S.C. 154(b) by 388 days.

(21) Appl. No.: 13/269,866

(22) Filed: Oct. 10, 2011

(65) Prior Publication Data

US 2013/0089802 A1      Apr. 11, 2013

(51) Int. Cl.
*H01M 2/14*      (2006.01)

(52) U.S. Cl.
USPC .......................................................... 429/457

(58) Field of Classification Search
None
See application file for complete search history.

(56) References Cited

U.S. PATENT DOCUMENTS

| 2004/0033395 | A1* | 2/2004 | Thompson | 429/13 |
| 2008/0113254 | A1 | 5/2008 | Christie et al. | |
| 2008/0171253 | A1* | 7/2008 | Owejan et al. | 429/34 |

* cited by examiner

*Primary Examiner* — Patrick Ryan
*Assistant Examiner* — Wyatt McConnell
(74) *Attorney, Agent, or Firm* — Patent Central LLC; Stephan A. Pendorf

(57) ABSTRACT

Flow field plate constructions for bipolar plates are disclosed for use in fuel cell stacks that are subject to freezing temperatures. In designs having internal coolant flow fields and reactant backfeed ports, relief ducts are provided in the supporting walls surrounding the backfeed ports in order to allow for ice formation and thus prevent cracking of the plates.

14 Claims, 3 Drawing Sheets

FLOW FIELD PLATE WITH RELIEF DUCTS FOR FUEL CELL STACK

BACKGROUND

1. Field of the Invention

This invention relates to flow field plate constructions for bipolar plates comprising an internal coolant flow field for use in fuel cell stacks subject to freezing temperatures in operation or storage. In particular, it relates to design features in the vicinity of the reactant inlet and outlet ports of the plates for accommodating the formation of ice.

2. Description of the Related Art

Solid polymer electrolyte or proton exchange membrane fuel cells (PEMFCs) electrochemically convert reactants, namely fuel (such as hydrogen) and oxidant (such as oxygen or air), to generate electric power. PEMFCs generally employ a proton conducting polymer membrane electrolyte between two electrodes, namely a cathode and an anode. A structure comprising a proton conducting polymer membrane sandwiched between two electrodes is known as a membrane electrode assembly (MEA). In a typical fuel cell, an anode flow field plate and a cathode flow field plate, each comprising numerous fluid distribution channels for the reactants, are provided on either side of a MEA to distribute fuel and oxidant to the respective electrodes and to remove by-products of the electrochemical reactions taking place within the fuel cell. Water is the primary by-product in a cell operating on hydrogen and air reactants. Because the output voltage of a single cell is of order of 1 V, a plurality of cells is usually stacked together in series for commercial applications. In such a stack, the anode flow field plate of one cell is thus adjacent to the cathode flow field plate of the adjacent cell. For assembly purposes, a set of anode flow field plates is often bonded to a corresponding set of cathode flow field plates prior to assembling the stack. A bonded pair of an anode and cathode flow field plates is known as a bipolar plate assembly. Fuel cell stacks can be further connected in arrays of interconnected stacks in series and/or parallel for use in automotive applications and the like.

Along with water, heat is a significant by-product from the electrochemical reactions taking place within the fuel cell. Means for cooling a fuel cell stack is thus generally required. Stacks designed to achieve high power density (e.g. automotive stacks) typically circulate liquid coolant throughout the stack in order to remove heat quickly and efficiently. To accomplish this, coolant flow fields comprising numerous coolant channels are also typically incorporated in the flow field plates of the cells in the stacks. The coolant flow fields are typically formed on the electrochemically inactive surfaces of both the anode side and cathode side flow field plates (or fuel flow field plate and oxidant flow field plate respectively). By appropriate design, a sealed coolant flow field is created when both anode and cathode side plates are mated together into a bipolar plate assembly. The sealed coolant flow field can thus serve to distribute coolant evenly throughout the cells while keeping the coolant reliably separated from the reactants.

To provide both reactants and the coolant to and from the individual cells in the stack, a series of ports are generally provided at opposing ends of the individual cells such that when the cells are stacked together they form manifolds for these fluids. Further required design features then are passageways in the plates to distribute the bulk fluids from the formed manifolds to and from the various channels in the reactant and coolant flow fields in the plates. Herein, these passageway regions are referred to as the transition regions. The transition regions can themselves comprise numerous fluid distribution channels, e.g. oxidant and/or fuel transition channels.

Another desirable feature in the flow field plates can include the use of what are known in the art as backfeed ports. Such ports allow for bulk fluids to initially be distributed from the formed manifolds to the "back" or inactive sides of the flow field plates and then subsequently to be fed to the active side of the plates through the backfeed ports. A reactant backfeed port is thus fluidly connected to a manifold port for that reactant via some suitable passage formed in the coolant surface of the plate. And the reactant backfeed port is also fluidly connected to the reactant flow field on the reactant surface of the plate via the passageways of the associated transition region.

US20080113254 for instance discloses exemplary flow field plate constructions incorporating backfeed features. Therein, a disclosed flow field plate assembly comprised first and second flow field plates and a body comprising a porous medium interposed between the first and second flow field plates, the porous medium being operable to allow passage of a fuel and an oxygen-containing gas therethrough, and block from passage therethrough, a flow of liquids to prevent water collection and ice formation, which may block passages formed on at least a portion of the first and/or second flow field plates.

In fuel cell stacks subject to freezing temperatures, accumulations of liquid water can be problematic because, when the water freezes, the ice formed can undesirably block fluid flows or the associated expansion of the solid ice can cause damage to the cell. Significant sized accumulations of liquid water which may be subject to freezing are therefore generally avoided, either by preventing accumulation in the first place or alternatively by removing them before they have the opportunity to freeze. For example, the aforementioned US20080113254 for instance attempts to prevent undesirable water accumulation. Alternatively, various techniques are disclosed in the art for removing water from a fuel cell stack prior to shutdown and storage in subzero temperatures.

However, with the ever changing cell designs, operating conditions, and other advances in the field, problematic accumulations of liquid water may occur in locations and/or under certain conditions where hitherto there was no concern. This invention addresses such issues and provides further related advantages.

SUMMARY

It has been found that ice formation from water accumulated in the regions around the backfeed ports can lead to flow field plate breakage and unacceptable reactant leaks in certain fuel cell stack designs. Specifically, the cells in such fuel cell stacks comprise a bipolar plate assembly in which a flow field plate therein comprises:

opposing major surfaces for distribution of a reactant and a coolant respectively, reactant ports for the inlet and for the outlet of the reactant, a backfeed port adjacent to one of these reactant ports, in which the backfeed port is fluidly connected to the one of the reactant ports by a passage formed in the coolant surface of the plate, a reactant flow field comprising a flow field formed in the reactant surface of the plate and fluidly connected to the reactant backfeed port and to the other reactant port, coolant ports for the inlet and for the outlet of the coolant, a coolant flow field comprising a flow field formed in the coolant surface of the plate which fluidly connects to the coolant inlet port and to the coolant outlet port, a supporting wall surrounding both the backfeed port and the adjacent reactant port on the coolant surface of the plate, a sealing wall surrounding the supporting wall on the coolant surface of the plate, and a groove formed on the coolant surface of the plate between the supporting wall and the sealing wall.

Ice can form in such cells in the regions around the reactant ports on the coolant side of the flow field plate, and in turn this can damage the plates due to ice expansion. However, we have found that this damage can be prevented by incorporating one or more relief ducts in the supporting wall adjacent the backfeed port such that the groove is fluidly connected to the backfeed port. Preferably, the supporting wall comprises a plurality of such ducts.

To accommodate the volume of formed ice, the ducts can desirably be sized such that the volume of the duct or plurality of ducts to that of the volume of the groove in the region adjacent the backfeed port is between about 1:17 and 1:4. Further, the width of the duct can be greater than or equal to the width of the groove or alternatively greater than or about 0.8 mm.

In the cell designs in the Examples below, ice formation in the region around the fuel outlet can be particularly problematic. Here then, the invention is particularly suitable for a flow field plate in which the reactant involved is a fuel (i.e. the fuel or anode side flow field plate in a bipolar plate assembly) and the backfeed port is the one associated with the fuel outlet port therein.

The flow field plates involved can be made of molded carbon and the ducts may be formed by embossing or other conventional means.

In some designs, the backfeed ports in one of the flow field plates in a bipolar plate assembly may be located outside the area defined by the reactant flow field in the second of the flow field plates in the assembly. In such designs, ice formation in the region of the backfeed port on the first plate may cause damage to the second plate (e.g. cracking) and thus a potential leakage path through the second plate. However, because of the location of the backfeed port in such designs, any leaks may be contained by other seals employed in the stack and there may be no problematic mixing of the two reactants. On the other hand, if the backfeed ports are located opposite or within the area defined by the second reactant flow field, damage to the second plate in this area can result in a leakage path which allows the two reactants to mix. This can be a much more serious concern and thus flow field plates of the invention can be particularly suitable for such designs.

An additional benefit of incorporating such ducts is that they can also serve to vent trapped gas when gluing or otherwise bonding together a bipolar plate assembly using such flow field plates. Typically though, much fewer vents having much less associated volume would be employed solely to vent trapped gas.

Within the scope of the invention therefore are flow field plates, bipolar plate assemblies using such plates, fuel cell stacks using such bipolar plate assemblies, and methods for making all these. These and other aspects of the invention are evident upon reference to the attached Figures and following detailed description.

DETAILED DESCRIPTION

A PEMFC stack intended for automotive applications is an example of a stack which generally must be capable of being operated and stored at below 0° C. Damage resulting from ice formation within the cells in the stack must therefore be prevented. Such a stack typically comprises a series stack of generally rectangular, planar PEM fuel cells. The fuel employed is usually pure hydrogen although other fuels may be considered. Air is usually provided as the oxidant. The individual PEM fuel cells comprise a membrane electrode assembly (MEA) of a polymer membrane electrolyte and two, usually noble metal based, catalyst layers on either side of the membrane electrolyte which serve as the anode and cathode respectively. Gas diffusion layers are usually provided adjacent the catalyst layers in the MEA for several purposes, e.g. to uniformly distribute reactant gases to and by-product fluids from the electrodes, to provide electrical connection to the electrodes, and to provide mechanical support. These gas diffusion layers are engineered porous, electrically conductive structures and typically comprise carbon fibres, binder, and materials to adjust the wetting characteristics of the layers. Fuel and oxidant flow field plates are then provided adjacent the anode and cathode gas diffusion layers respectively to distribute bulk fluids to and from the gas diffusion layers, to provide mechanical support, to provide a manifold structure for the fluids that are delivered to and from the cells, and also to provide a structure for circulating liquid coolant to the fuel cells. Other specialized layers or sublayers may also be provided for various purposes in the structure (for instance, between electrode and gas diffusion layer or between gas diffusion layer and flow field plate).

Pairs of fuel and oxidant flow field plates are usually bonded together to form bipolar plate assemblies early in the stack assembly process. Bonding can be achieved using an appropriate gluing process. Glue beads can also serve as seals for various structures formed by mating the plates together (e.g. coolant flow fields, manifold ports).

Figure 1A:
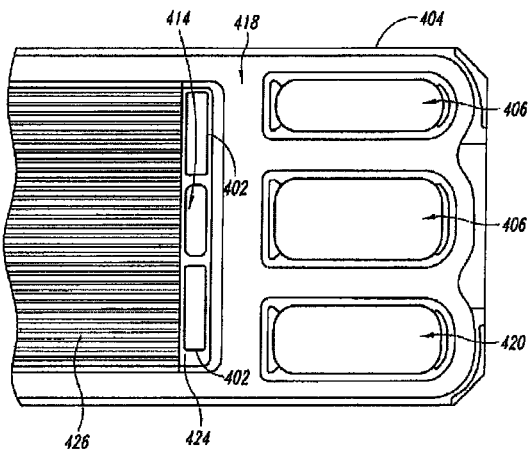
FIGS. 1a and 1b show the active (reactant) side and the inactive (coolant) side respectively of a prior art flow field plate comprising reactant backfeed ports for use in a bipolar plate assembly for a PEMFC (reproduced from US2008/0113254).
Figure 1B:
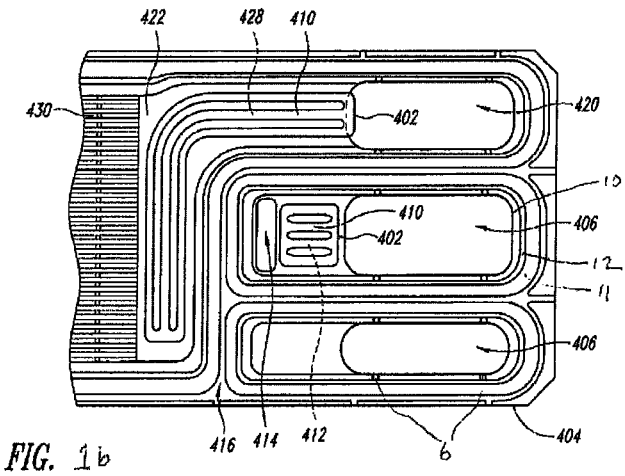

A representative example of a prior art flow field plate comprising reactant backfeed ports for use in a bipolar plate assembly for a PEMFC is shown in FIGS. 1a and 1b. The active (or reactant) side 418 near an end of the plate is shown in FIG. 1a. The inactive (or coolant) side 416 near the same end of the plate is shown in FIG. 1b. These two Figures have been reproduced from US2008/0113254 and where possible, the original numbering and nomenclature have been maintained here for convenient reference.

At the end of the flow field plate are reactant manifold openings (ports) 406 for the bulk supply or exhaust of the fuel and oxidant reactant streams provided to the cell, and coolant manifold opening (port) 420 for the bulk supply or exhaust of the coolant provided to the cell. The flow field plate may be for either the fuel or oxidant reactant and the end shown in the Figures may be for either a supply or exhaust of the reactant. However, the reactant associated with the plate as shown is either supplied or exhausted from the reactant manifold opening 406 located in the middle of the plate. Backfeed port 414 allows for fluid connection of the reactant between the reactant flow channels 426 on the active side 418 and the middle one of the two reactant manifold openings 406 on the inactive side 416 of the flow field plate.

Also identified in FIG. 1*a* are reactant transition region 424 and porous media 402 which relate to the invention of US2008/011354 and not to a typical flow field plate construction. Similar porous media 402 and limbs 410 of porous media 402 appear in FIG. 1*b* but again these are not typical flow field plate features. FIG. 1*b* also shows coolant flow field channels 430, coolant transition region 422, and coolant feed channels 428 which serve to fluidly connect coolant manifold opening 420 to coolant flow field channels 430. In a like manner, backfeed channels 412 serve to fluidly connect the middle reactant manifold opening 406 to backfeed port 414 on the inactive side 416 of plate 404.

Although not discussed in US2008/011354, FIG. 1*b* shows features around reactant manifold openings 406 that are useful for supporting, bonding, and sealing purposes. As shown, supporting wall 10 completely surrounds both backfeed port 414 and the adjacent reactant manifold opening (port) 406. In turn another wall, namely sealing wall 11, surrounds supporting wall 10 and thereby forms groove 12 therebetween. In assembling a bipolar plate assembly with this flow field plate, glue can be applied over numerous surfaces, including the entire surface of sealing wall 11. Aside from bonding the assembly together, the glue joint on sealing wall 11 serves as a suitable seal for the region containing backfeed port 414 and the middle reactant manifold opening 406. Groove 12 can serve as a spill groove for glue which may be displaced during bonding. Supporting wall 10 provides mechanical support and also serves to prevent displaced glue from interfering with other features in this region. And glue vents 6 are provided in supporting wall 10 in order to vent trapped gases during assembly or gases associated with curing of the glue. (Typically such vents have a low associated volume and are located away from the backfeed port so as to prevent gases from entering the active area of the fuel cell. Further, the number and size of the vents are kept to a minimum to reduce stress concentration issues and tooling die cost.)

Figure 2:
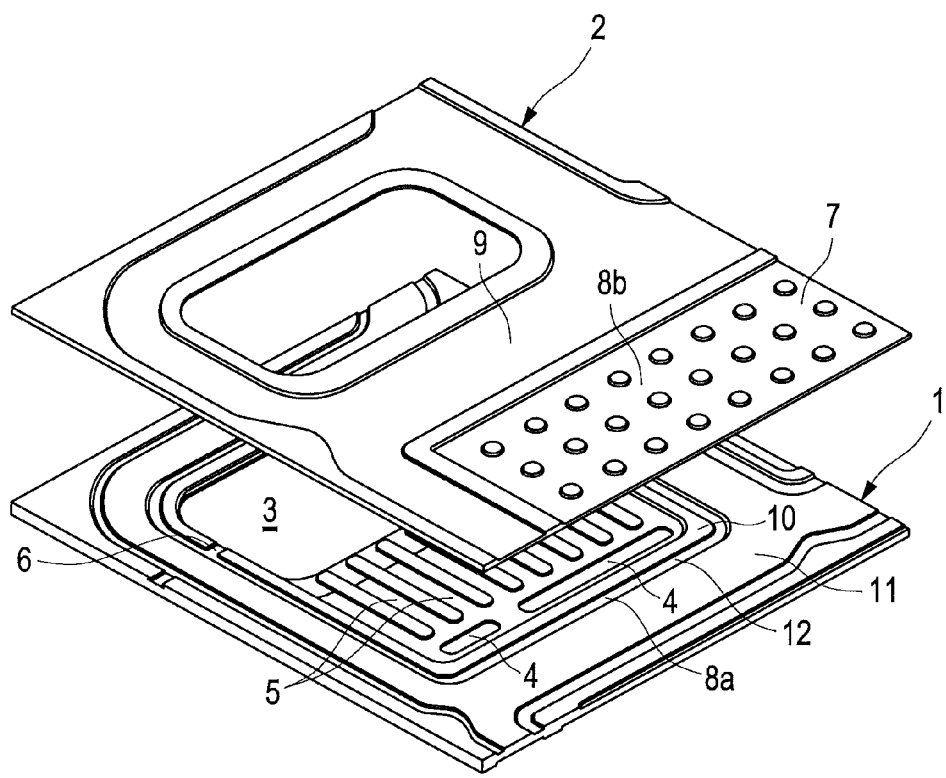
FIG. 2 shows an exploded isometric view of the region near the fuel outlet port of a bipolar plate assembly in a PEMFC stack of the Examples in which the oxidant plate opposite the backfeed port associated with the fuel outlet was damaged after freezing the stack.

FIG. 2 shows an exploded isometric view of the region near the fuel outlet port of another exemplary prior art bipolar plate assembly. The coolant side of fuel flow field plate 1 and the oxidant side of oxidant flow field plate 2 are visible in FIG. 2. Also as shown, fuel flow field plate 1 comprises fuel outlet port 3, backfeed ports 4 (there are two of them), fuel backfeed channels 5, supporting wall 10, sealing wall 11, and groove 12. Glue vents 6 are provided between groove 11 and fuel outlet port 3 to allow ambient gases to escape when assembling plates 1 and 2 together into a unitary bipolar plate. (This involves applying a bead of glue to sealing wall 11, pressing the two plates together thereby displacing ambient gases, and allowing the glue joint to cure.) In FIG. 2, a portion of the oxidant flow field 7 is visible on oxidant flow field plate 2.

As demonstrated in the Examples to follow, water can accumulate in groove 12 during operation of a PEMFC stack like that shown in FIG. 2. When such a stack is then exposed to below freezing temperatures, the accumulated water can freeze and the associated expansion due to the formation of ice can result in damage to the plates. For instance, in the embodiment shown in FIG. 2, ice forming at location 8*a* in fuel flow field plate 1 can result in cracking at location 8*b* in oxidant flow field plate 2. And a crack formed at location 8*b*, within the active oxidant flow field 7, not only results in leakage but also undesirably permits fuel and oxidant gases to mix. (A crack in oxidant flow field plate 2 at, for instance, location 9 might be relatively benign if the seal structure only resulted in a minor leak of air and not a fuel leak nor a mixing of fuel and oxidant.)

Figure 3:
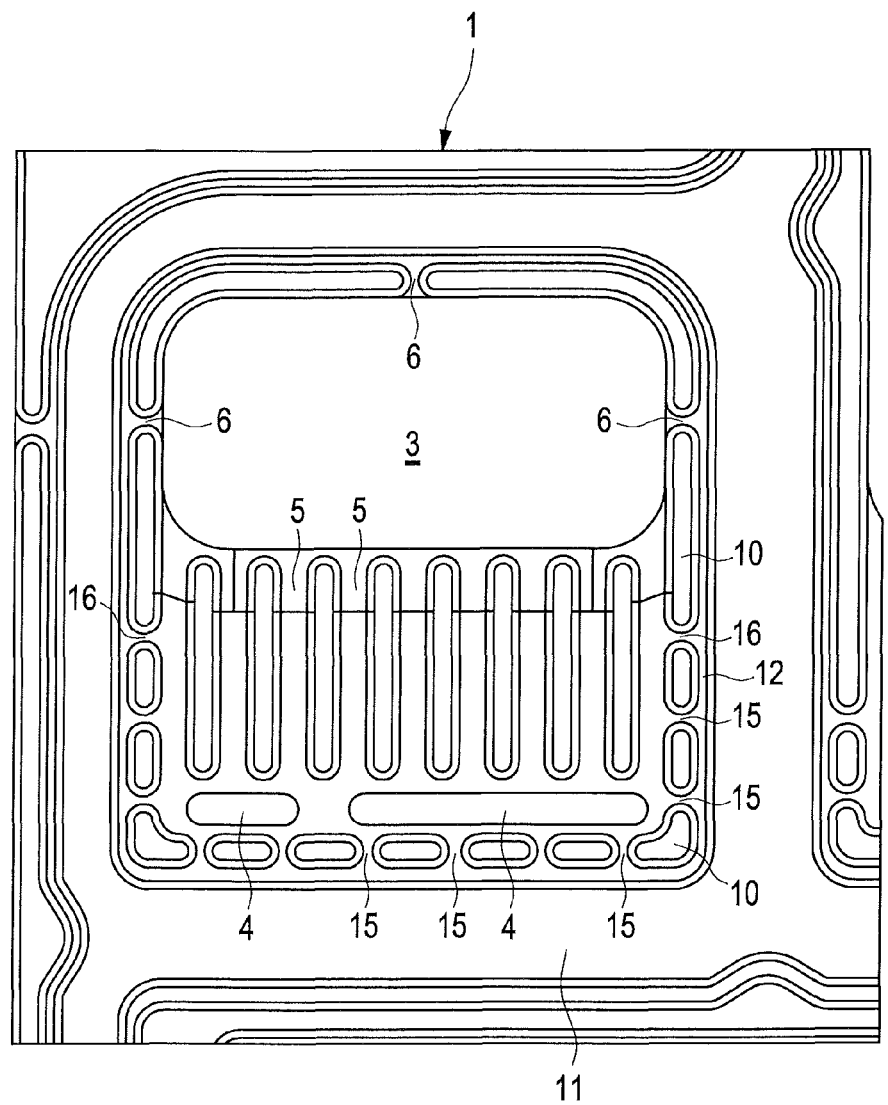
FIG. 3 shows a top view near the fuel outlet port of the coolant side of a fuel flow field plate in which the plate is similar to that shown in FIG. 2 but includes a plurality of relief ducts in the supporting wall near the backfeed port. A PEMFC made with this plate did not suffer damage to the opposite oxidant plate after freezing.

However, damage such as cracks at location 8*b* in FIG. 2 can be prevented by incorporating one or more relief ducts in the supporting wall in accordance with the invention. FIG. 3 shows a top view of an embodiment with such relief ducts provided. The plate in FIG. 3 is similar to fuel flow field plate 1 in FIG. 2 except that a plurality of relief ducts 15 are provided in supporting wall 10 near backfeed ports 4.

Relief ducts 15 accommodate the expansion associated with the formation of ice from water which accumulated in groove 12 and then froze. For this purpose, relief ducts 15 are located adjacent backfeed ports 4. Herein, "located adjacent the backfeed port" means located closer to the backfeed port than to the associated reactant port (i.e. in FIG. 3, closer to backfeed ports 4 than fuel outlet port 3, or with reference to the following Examples, within about 5.5 mm of the backfeed port). Note that, as shown in FIG. 3, additional ducts 16 may optionally be provided that are closer to fuel outlet port 3.

The size, number, and spacing of relief ducts 15 are selected to provide ample volume for expansion and frequent opportunity for expansive relief. A plurality of relief ducts 15 spaced around backfeed ports 4 can therefore be preferred.

Other embodiments than that shown in FIG. 3 may of course be contemplated in order to obtain the advantages of the invention.

The following examples are illustrative of the invention but should not be construed as limiting in any way.

EXAMPLE

A comparative fuel cell stack comprising bipolar plate assemblies like those shown in FIG. 2 was operated for a lengthy period of time. The stack was then shutdown according to the usual protocol and stored at subzero temperature. After a subsequent startup and initial period of operation, a significant leakage of fuel into the oxidant was detected. On disassembly, it was observed that cracking of the oxidant flow field plate had occurred in the vicinity of location 8*b* as shown in FIG. 2.

In the preceding fuel cell stack, the groove had an essentially uniform rectangular cross-section throughout, with a width of about 0.8 mm and a depth of 0.3 mm. Except for the presence of vents, the supporting wall also had an essentially uniform rectangular cross-section, with a width of about 1.3 mm.

A fuel flow field plate of the invention was then prepared which was similar to those in the comparative stack except that a plurality of relief ducts were incorporated in the supporting wall just as shown in FIG. 3. These ducts were about 0.8 mm wide and, except at the corners, were spaced about 2.7 mm apart. The inventive fuel flow field plate was assembled into a cell and then in turn assembled into a test stack, which was operated, stored below freezing, and then restarted in a like manner to the comparative fuel cell stack above. No leakage in this cell was detected and on subsequent disassembly, no damage was noticed to the associated partner oxidant flow field plate.

These examples demonstrate both a problem with the prior art comparative fuel cell stack and also a remedy using an embodiment of the invention.

All of the above U.S. patents, U.S. patent application publications, U.S. patent applications, foreign patents, foreign patent applications and non-patent publications referred to in this specification, are incorporated herein by reference in their entirety.

While particular elements, embodiments and applications of the present invention have been shown and described, it will be understood, of course, that the invention is not limited thereto since modifications may be made by those skilled in the art without departing from the spirit and scope of the present disclosure, particularly in light of the foregoing teachings. Such modifications are to be considered within the purview and scope of the claims appended hereto.

What is claimed is:

1. A flow field plate for a bipolar plate assembly for a fuel cell stack comprising:
    opposing major surfaces for distribution of a reactant and a coolant respectively;
    a reactant port for the inlet of the reactant;
    a reactant port for the outlet of the reactant;
    a backfeed port adjacent to one of the reactant ports, the backfeed port fluidly connected to the one of the reactant ports by a passage formed in the coolant surface of the plate;
    a reactant flow field comprising a flow field formed in the reactant surface of the plate and fluidly connected to the reactant backfeed port and to the other reactant port;
    a coolant port for the inlet of the coolant;
    a coolant port for the outlet of the coolant;
    a coolant flow field comprising a flow field formed in the coolant surface of the plate and fluidly connected to the coolant inlet port and to the coolant outlet port;
    a supporting wall surrounding the backfeed port and the adjacent reactant port on the coolant surface of the plate;
    a sealing wall surrounding the supporting wall on the coolant surface of the plate; and
    a groove formed on the coolant surface of the plate between the supporting wall and the sealing wall;
    wherein the supporting wall comprises at least one duct located adjacent the backfeed port and fluidly connecting the groove to the backfeed port.

2. The flow field plate of claim 1 wherein the supporting wall comprises a plurality of ducts adjacent the backfeed port fluidly connecting the groove to the backfeed port.

3. The flow field plate of claim 2 wherein the volume of the plurality of ducts to that of the volume of the groove in the region adjacent the backfeed port is between about 1:17 and 1:4.

4. The flow field plate of claim 1 wherein the width of the duct is greater than or equal to the width of the groove.

5. The flow field plate of claim 1 wherein the width of the duct is greater than or about 0.8 mm.

6. The flow field plate of claim 1 wherein the reactant is a fuel.

7. The flow field plate of claim 6 wherein the backfeed port is adjacent to the fuel outlet port and is fluidly connected to the fuel outlet port by a passage formed in the coolant surface of the plate.

8. The flow field plate of claim 1 wherein the flow field plate is made of molded carbon.

9. A bipolar plate assembly comprising the flow field plate of claim 1.

10. The bipolar plate assembly of claim 9 comprising a second flow field plate for a second reactant, the second flow field plate comprising a second reactant flow field comprising a flow field formed in a reactant surface of the second flow field plate, wherein the backfeed port is located opposite the area defined by the second reactant flow field.

11. A fuel cell stack comprising a stack of solid polymer electrolyte fuel cells in series wherein the fuel cells comprise the bipolar plate assembly of claim 9.

12. A method for preventing damage to a bipolar plate assembly in a fuel cell stack as a result of freezing, the bipolar plate assembly comprising a flow field plate for a reactant, and the flow field plate comprising opposing major surfaces for distribution of a reactant and a coolant respectively; a reactant port for the inlet of the reactant; a reactant port for the outlet of the reactant; a backfeed port adjacent to one of the reactant ports, the backfeed port fluidly connected to the one of the reactant ports by a passage formed in the coolant surface of the plate; a reactant flow field comprising a flow field formed in the reactant surface of the plate and fluidly connected to the reactant backfeed port and to the other reactant port; a coolant port for the inlet of the coolant; a coolant port for the outlet of the coolant; a coolant flow field comprising a flow field formed in the coolant surface of the plate and fluidly connected to the coolant inlet port and to the coolant outlet port; a supporting wall surrounding the backfeed port and the adjacent reactant port on the coolant surface of the plate; a sealing wall surrounding the supporting wall on the coolant surface of the plate; and a groove formed on the coolant surface of the plate between the supporting wall and the sealing wall, the method comprising:
    incorporating at least one duct in the supporting wall adjacent the backfeed port and fluidly connecting the groove to the backfeed port.

13. The method of claim 12 comprising incorporating a plurality of ducts in the supporting wall adjacent the backfeed port to fluidly connecting the groove to the backfeed port.

14. The method of claim 13 comprising selecting a volume for the plurality of incorporated ducts such that the ratio of duct volume to that of the volume of the groove in the region adjacent the backfeed port is between about 1:17 and 1:4.

* * * * *